Oct. 12, 1954
W. E. McANLY
2,691,361
WIND ORIENTED ANIMAL FEEDING DEVICE
Filed March 28, 1952
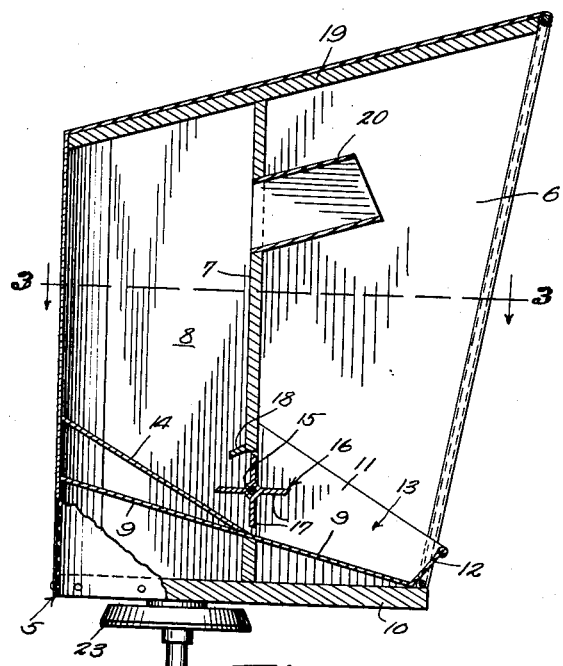
Fig. 2.
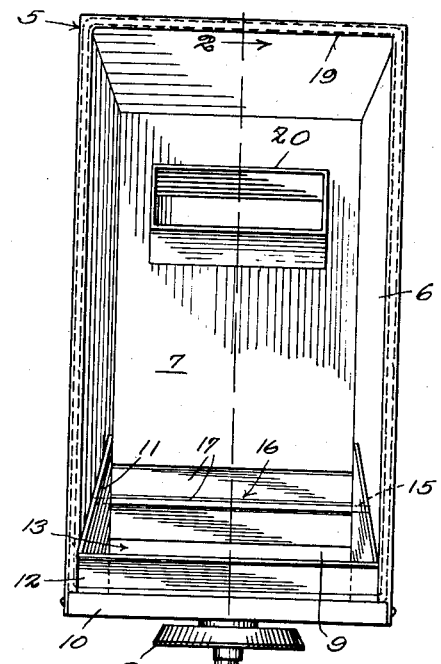
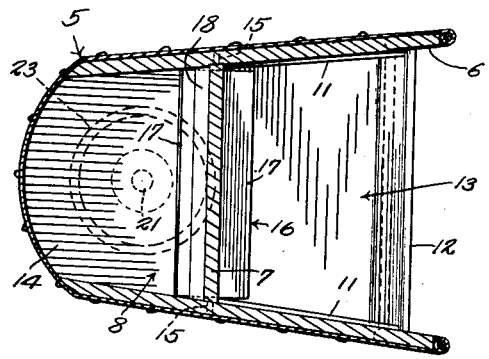
Fig. 3.
Fig. 1.
W. E. McAnly
INVENTOR
BY 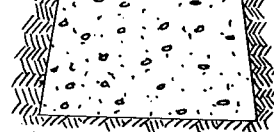
ATTORNEYS.

Patented Oct. 12, 1954

2,691,361

UNITED STATES PATENT OFFICE 2,691,361

WIND ORIENTED ANIMAL FEEDING DEVICE

William E. McAnly, Arcadia, Fla.

Application March 28, 1952, Serial No. 279,171

1 Claim. (Cl. 119—54)

This invention relates to animal feeding devices or troughs, designed for feeding dry feed, the primary object of the invention being to provide a feeder wherein the feed will be directed to a trough from a bin in communication with the trough, the construction of the feeder being such that the major portion of the feed will be protected against the elements at all times.

An important object of the invention is to provide a feeder of this character wherein the feed will be agitated by the animal feeding from the feeder, so that feed will only be delivered to the trough as it is being consumed by the animal.

Another object of the invention is to provide a support for the feeder which will revolve or swing under wind pressure, to the end that the open side of the feeder will be maintained in a direction opposite to the wind pressure.

A still further object of the invention is to provide an agitator which includes blades that normally close the passageway between the feed bins and trough to exclude the elements.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Figure 1 is a front elevational view of a feeder constructed in accordance with the invention.

Fig. 2 is a sectional view taken on line 2—2 of Fig. 1.

Fig. 3 is a sectional view taken on line 3—3 of Fig. 2.

Referring to the drawing in detail, the feeding device is indicated generally by the reference character 5 and as shown, is of box-like formation, with an open front 6.

The reference character 7 indicates the vertical partition which is spaced from the rear wall of the feeding device providing a bin 8 with the rear wall, the lower end of the partition being spaced from the bottom 9, which is disposed within the feeding device and supported directly above the bottom 10 constituting the main support for the feeding device. Forming a part of the inclined bottom 9, are the side flanges 11 and the forward flange 12, which flanges extend to the vertical partition 7 providing the feed trough 13.

An auxiliary inclined bottom 14 rests on the bottom 9 and has its forward end disposed within the space between the lower end of the vertical partition 7 and bottom 9, so that feed contained in the bin 8 will be fed into the trough 13, over said auxiliary inclined bottom 14.

Extending longitudinally of the space between the inclined bottom 9 and lower end of the partition 7, is the shaft 15 on which the agitator 16 is pivotally mounted, the agitator embodying a hub from which the blades 17 radiate. The blades of the agitator also provide a closure normally closing the passageway between the feed bin and feed trough. The reference character 18 indicates a curved flange which extends inwardly from the lower edge of the partition 7 to direct feed inwardly at the bottom of the bin 8 and prevent the packing of the feed around the agitator 16, to insure the operation of the agitator.

The top of the feeder indicated by the reference character 19 is inclined rearwardly to direct rain away from the open front of the feeding device, thereby preventing deterioration of the feed which may be in the trough 13, due to the elements.

Feed is delivered into the bin 8 through the chute 20 which has one of its ends extended into an opening formed in the vertical partition 7 near the outer end of the partition 7, as clearly shown by the drawing.

The feeding device is supported on the standard 21 that has its lower end embedded in the concrete base 22, the upper end of the standard being provided with the turn table 23, which provides the connection between the feeding device and standard 21.

As shown, the turn table 23 is connected to the bottom of the feeding device at a point adjacent to the rear wall thereof, so that the feeding device may swing readily under wind pressure to a position to bring the rear of the feeding device into the wind, the open side of the feeding device being directed away from the wind and elements to protect the feed against being blown away by the wind.

From the foregoing it will be seen that due to the construction shown and described, I have provided a feeding device including a bin in which the major portion of the feed is held for distribution into the trough 13, the material feeding from the bin to the trough being controlled by the movements of the agitator which is rotated by the movements of the head and nose of the animal feeding from the trough, attempting to remove the feed.

Under normal conditions the agitator will maintain the opening between the feed bin and trough closed, with the result that a dry feed contained in the feeder will be protected against being displaced by wind pressure and only small quantities of feed required by the animals will be delivered into the trough during the feeding period.

Having thus described the invention, what is claimed is:

A cattle feeding device comprising a body, a vertical partition dividing the body into a feed trough and a feed bin, an inclined bottom for said feed bin, the lower end of said partition being spaced from said inclined bottom providing an opening establishing communication between the feed bin and feed trough, a horizontal rotary agitator embodying a hub, and blades radiating from said hub operating within said opening, the axis of said agitator hub being in a vertical line with said partition, and at least one of said blades extending beyond said vertical partition into said trough for contact by animals feeding from said trough, and rotating said agitator directing feed into said trough from said bin.

References Cited in the file of this patent

UNITED STATES PATENTS

| Number | Name | Date |
| --- | --- | --- |
| 1,545,007 | Milliken | July 7, 1925 |
| 2,168,639 | Yeaman | Aug. 8, 1939 |
| 2,230,058 | Hornung | Jan. 28, 1941 |
| 2,349,868 | Hyde | May 30, 1944 |
| 2,566,446 | Gomer | Sept. 4, 1951 |
| 2,636,474 | Parker | Apr. 28, 1953 |
| 2,673,551 | McAnly | Mar. 30, 1954 |